Oct. 20, 1970     D. J. ASENBAUER     3,534,866
STACKING AND NESTING BIN BOX
Filed Dec. 30, 1968     7 Sheets-Sheet 1
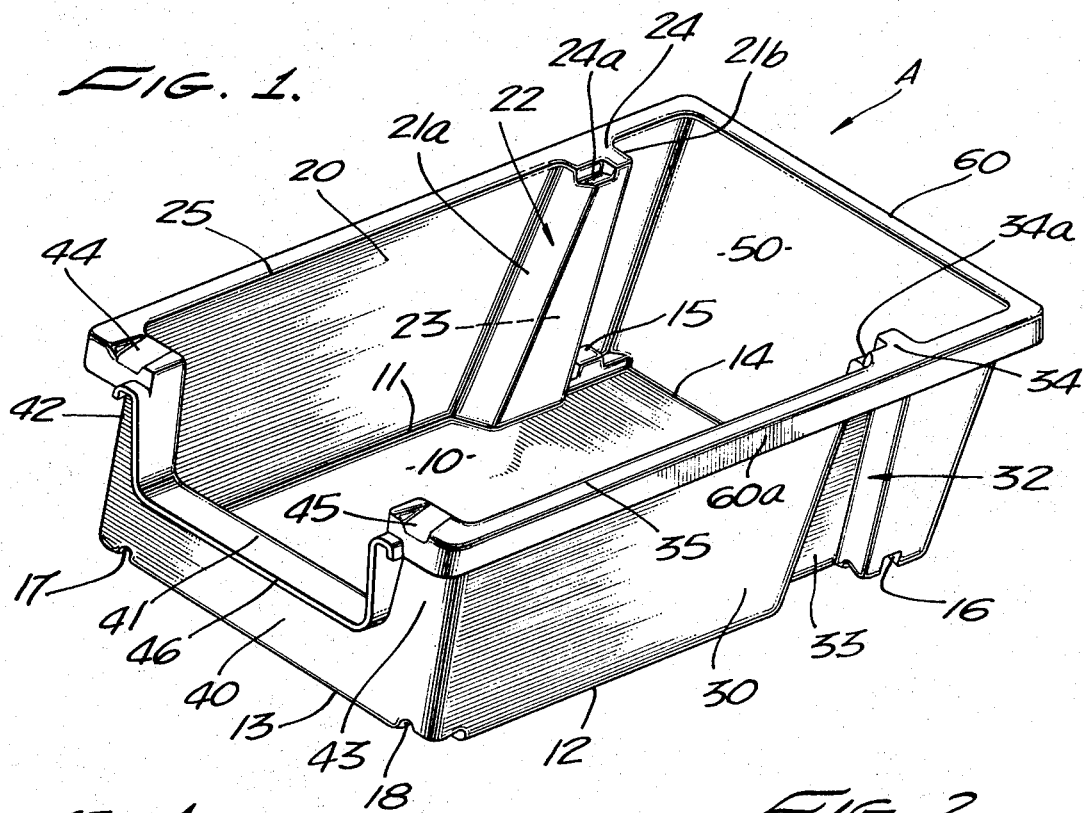
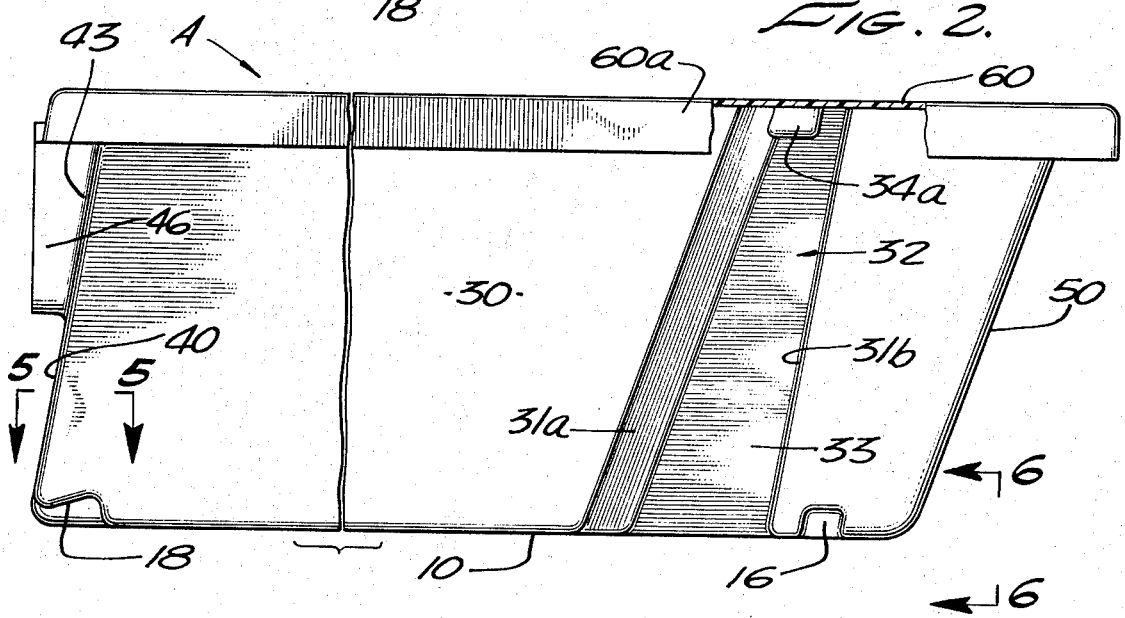
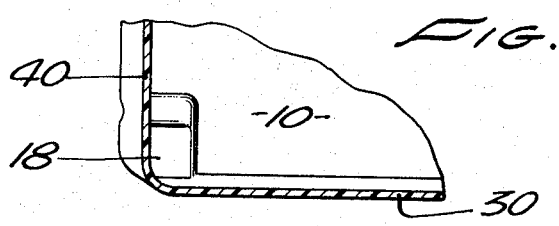
INVENTOR.
DONALD J. ASENBAUER
BY Beehler & Arant
ATTORNEYS

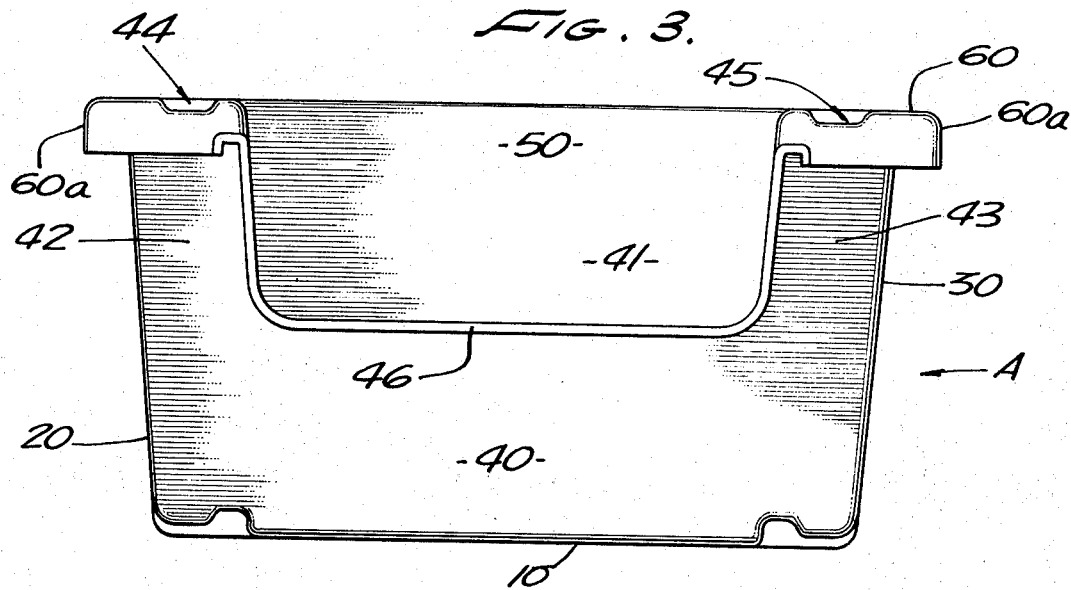
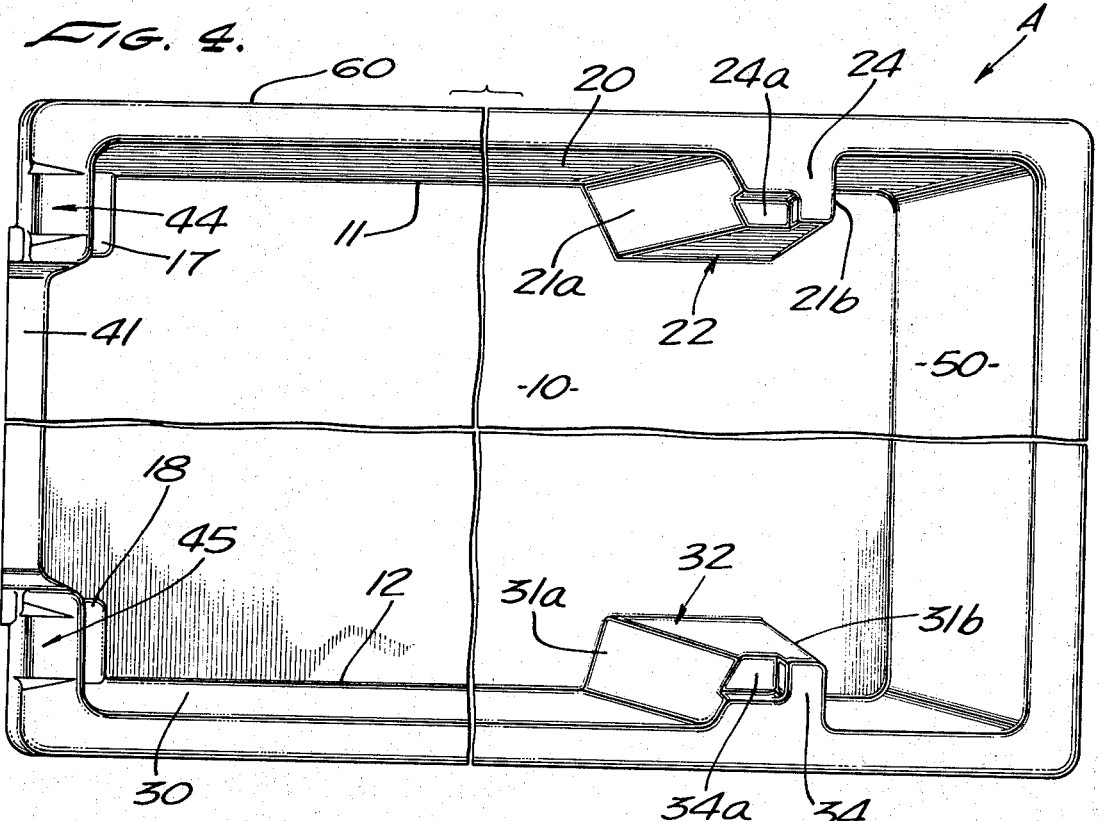
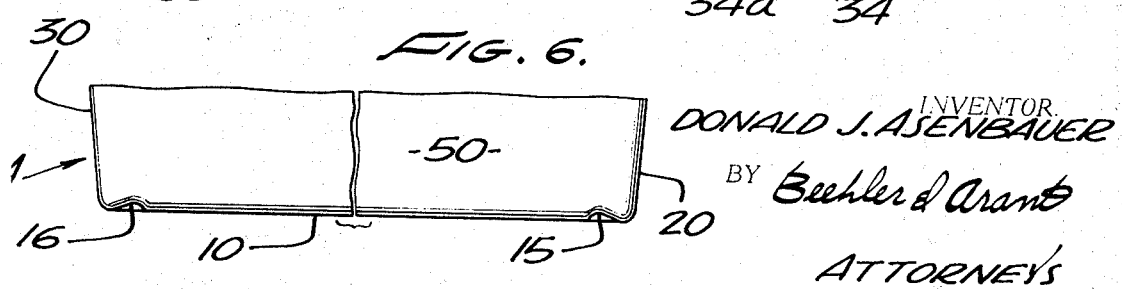

Oct. 20, 1970 D. J. ASENBAUER 3,534,866
STACKING AND NESTING BIN BOX
Filed Dec. 30, 1968 7 Sheets-Sheet 3

INVENTOR.
DONALD J. ASENBAUER
BY Beehler & Arant
ATTORNEYS

Oct. 20, 1970     D. J. ASENBAUER     3,534,866
STACKING AND NESTING BIN BOX

Filed Dec. 30, 1968     7 Sheets-Sheet 4

INVENTOR.
DONALD J. ASENBAUER
BY Beehler & Arant
ATTORNEYS

Oct. 20, 1970  D. J. ASENBAUER  3,534,866
STACKING AND NESTING BIN BOX

Filed Dec. 30, 1968  7 Sheets-Sheet 5

INVENTOR.
DONALD J. ASENBAUER
BY Beehler & Arant
ATTORNEYS

Oct. 20, 1970     D. J. ASENBAUER     3,534,866

STACKING AND NESTING BIN BOX

Filed Dec. 30, 1968     7 Sheets-Sheet 6

INVENTOR.
DONALD J. ASENBAUER
BY Beehler & Arant
ATTORNEYS

United States Patent Office 3,534,866
Patented Oct. 20, 1970

3,534,866
STACKING AND NESTING BIN BOX
Donald J. Asenbauer, Whittier, Calif., assignor to Shell Oil Company, New York, N.Y., a corporation of Delaware
Filed Dec. 30, 1968, Ser. No. 787,677
Int. Cl. A47f 3/14; B65d 21/04
U.S. Cl. 211—126                                12 Claims

ABSTRACT OF THE DISCLOSURE

A stacking and nesting bin box of generally rectangular configuration including a flat bottom wall and upstanding side and end walls, the front end wall being cut away at its upper center to provide a bin opening, and the side walls being convoluted inwardly at a point near to the rear end wall so as to provide a pair of stacking posts for stackably supporting a superimposed identical container.

BACKGROUND OF THE INVENTION

A stacking and nesting type of bin box is shown, for example, in U.S. Pat. No. 3,113,680. Such previously known containers have, however, been characterized by poor use of the available storage space, an outwardly sloping front end wall which permits some of the goods to be spilled out when the container undergoes rough handling, limited front end access when the containers are stacked vertically for use as bins, and poor stability which limits the permissible height of a stack.

The object and purpose of the present invention is to provide a stacking and nesting bin box which retains all of the advantages of previously known containers of this type, and at the same time overcomes at least to some extent the disadvantages mentioned above.

DRAWING SUMMARY

Figure 7:
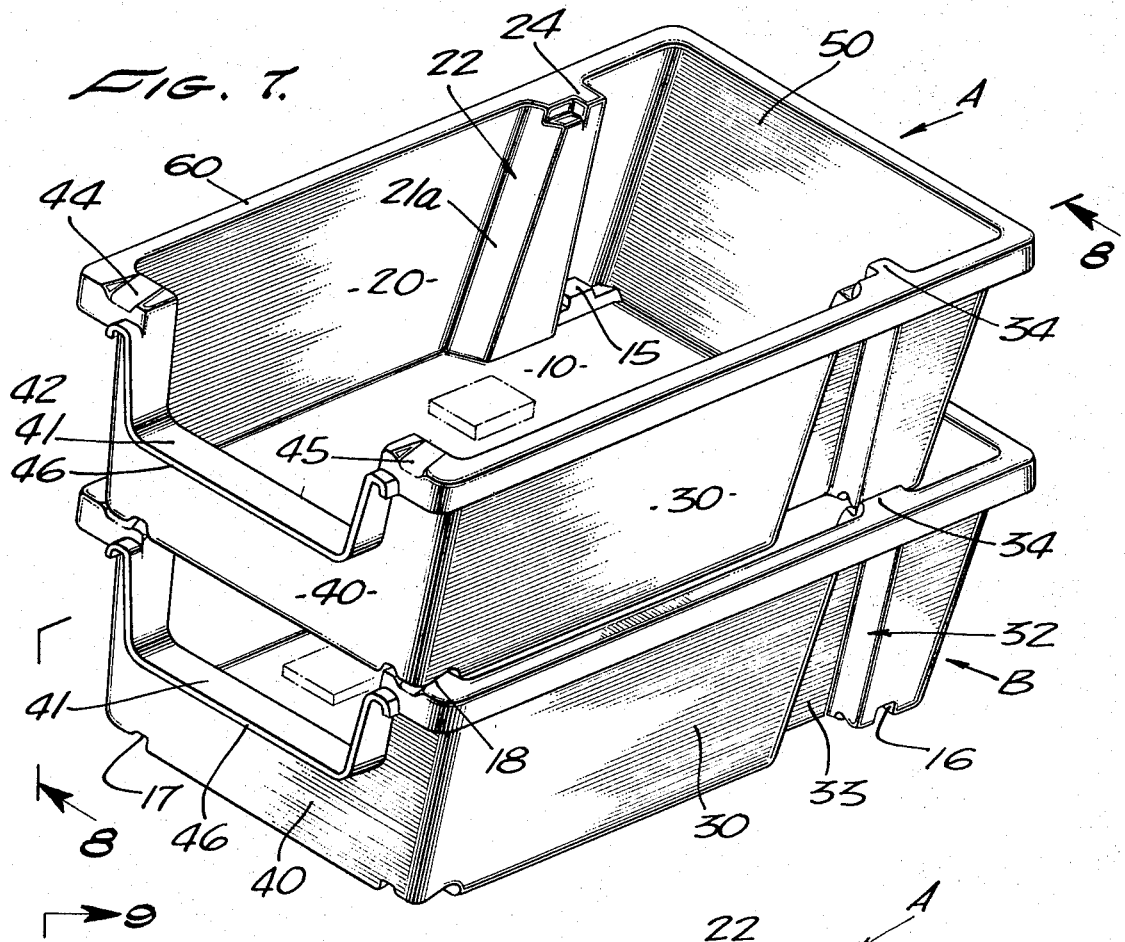
Figure 8:
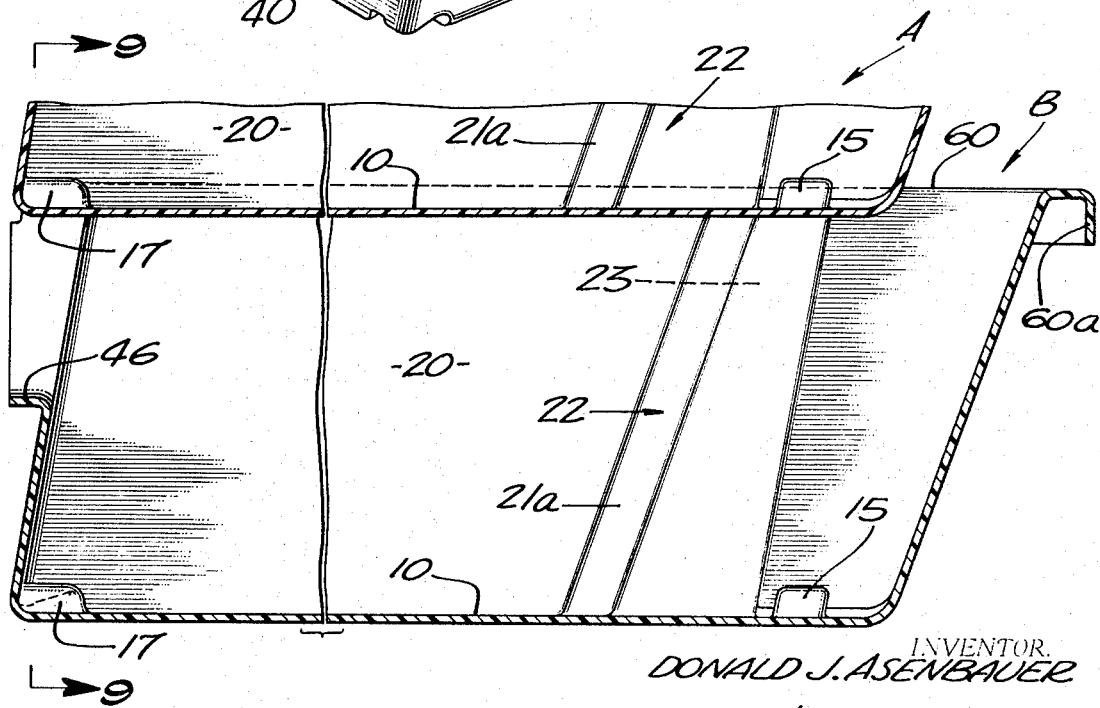
Figure 9:
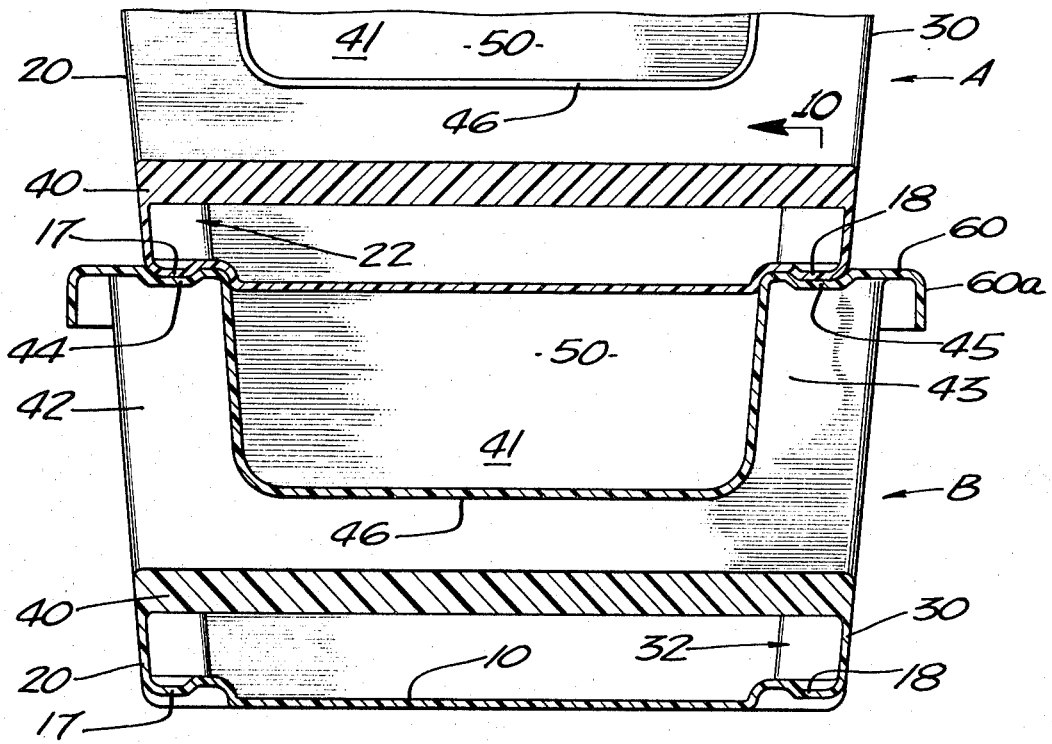
Figure 10:
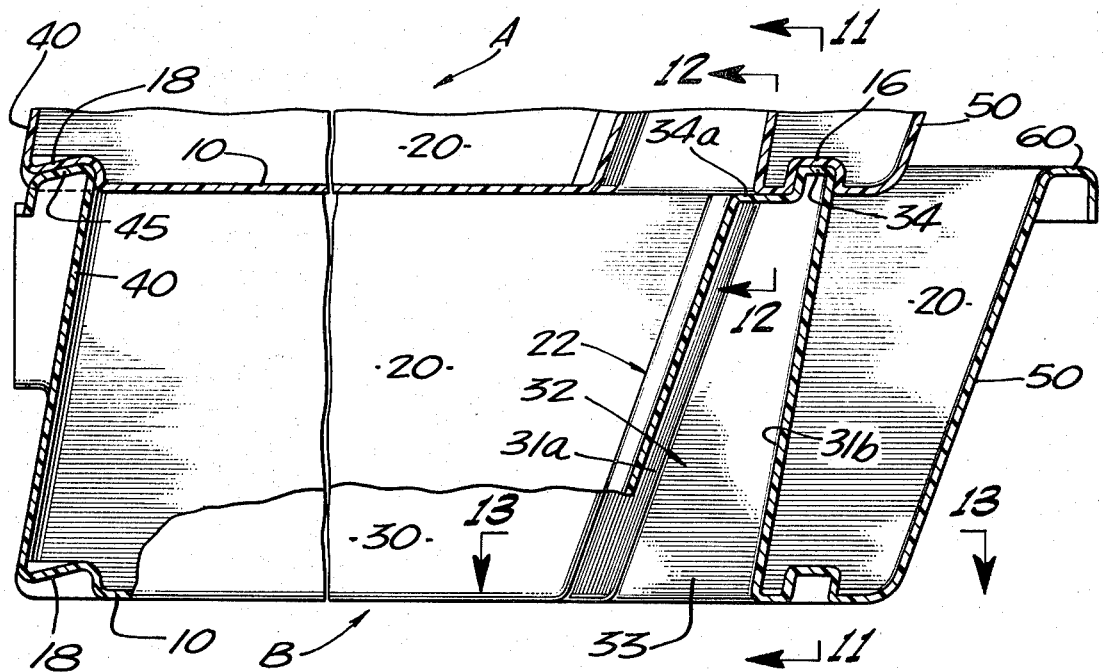
Figure 11:
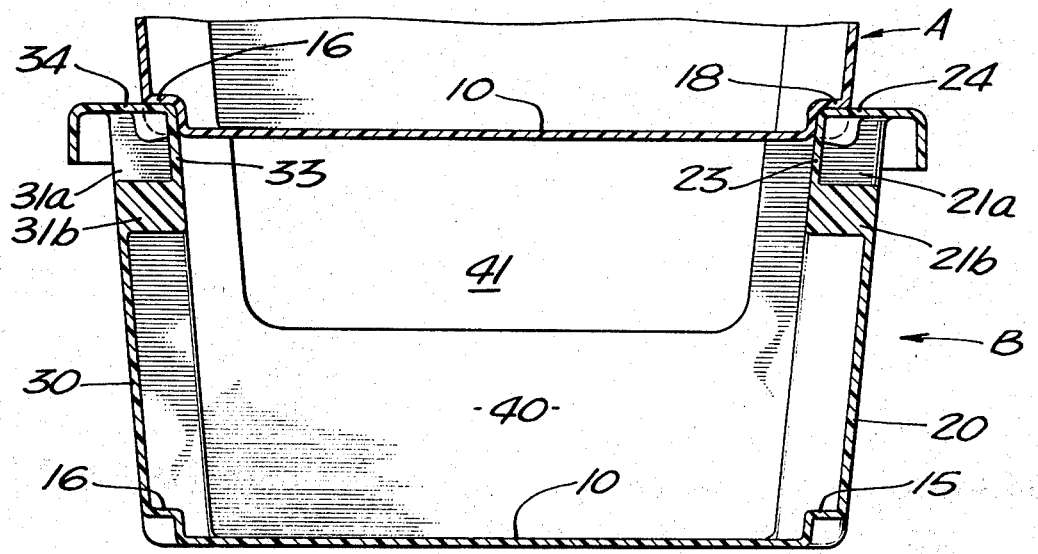
Figure 12:
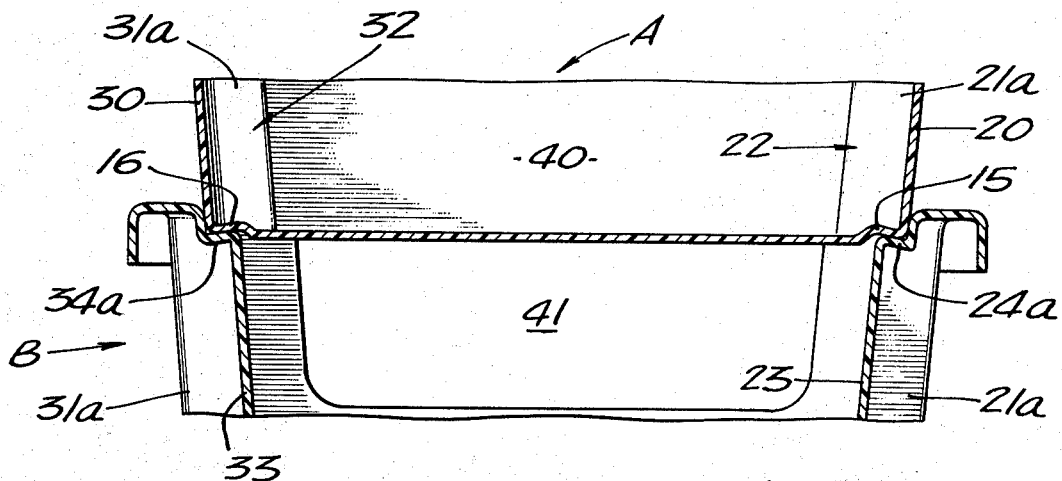
Figure 13:
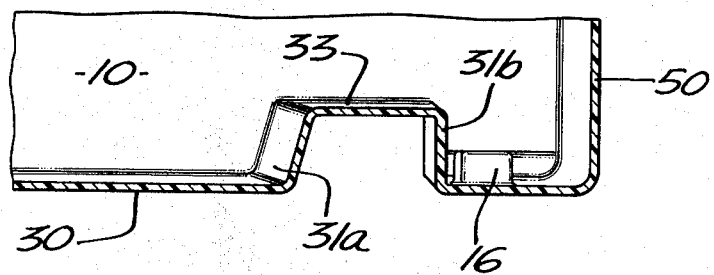
Figure 14:
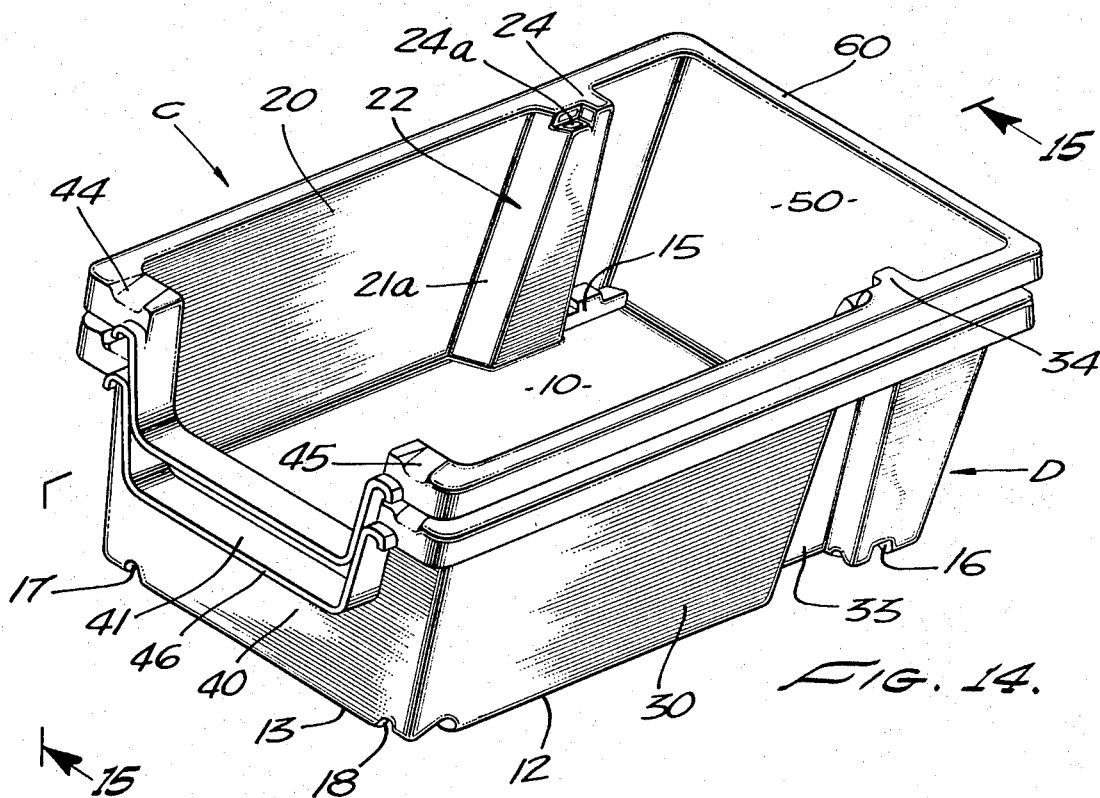
Figure 15:
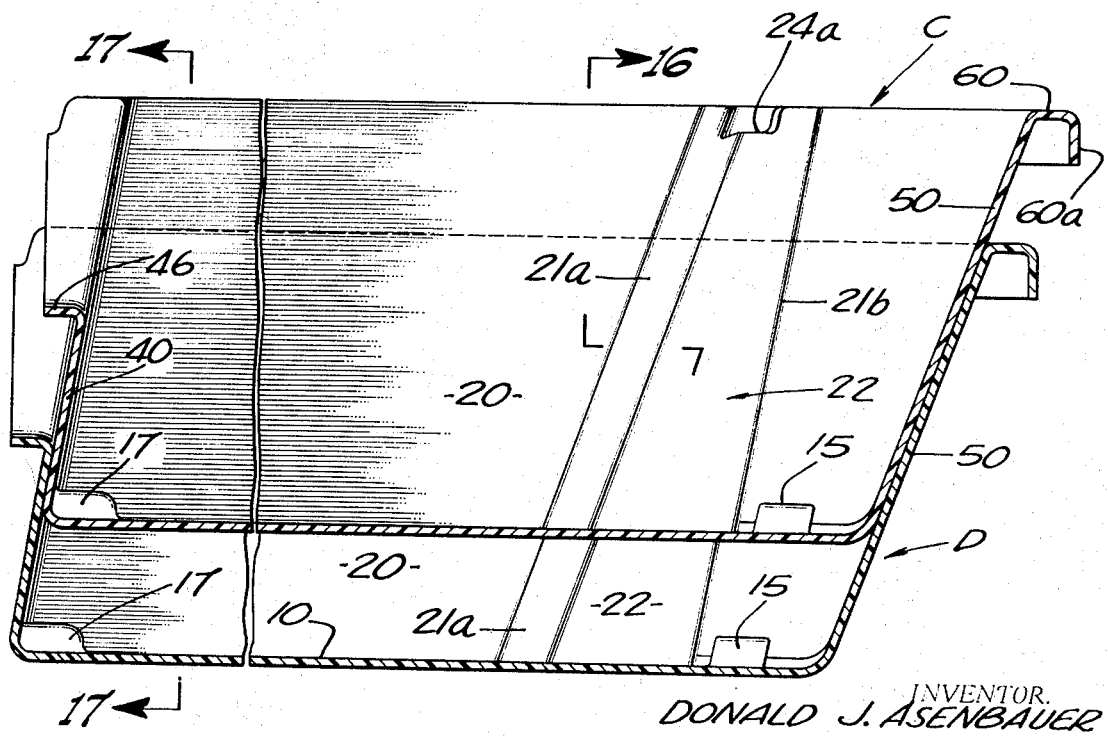
Figure 16:
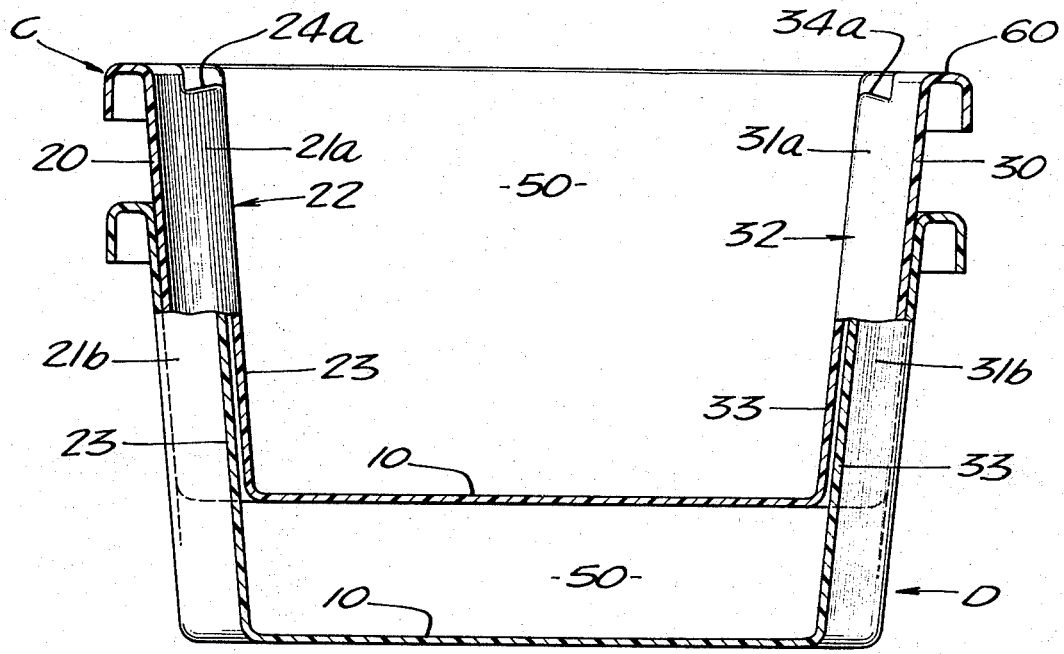
Figure 17:
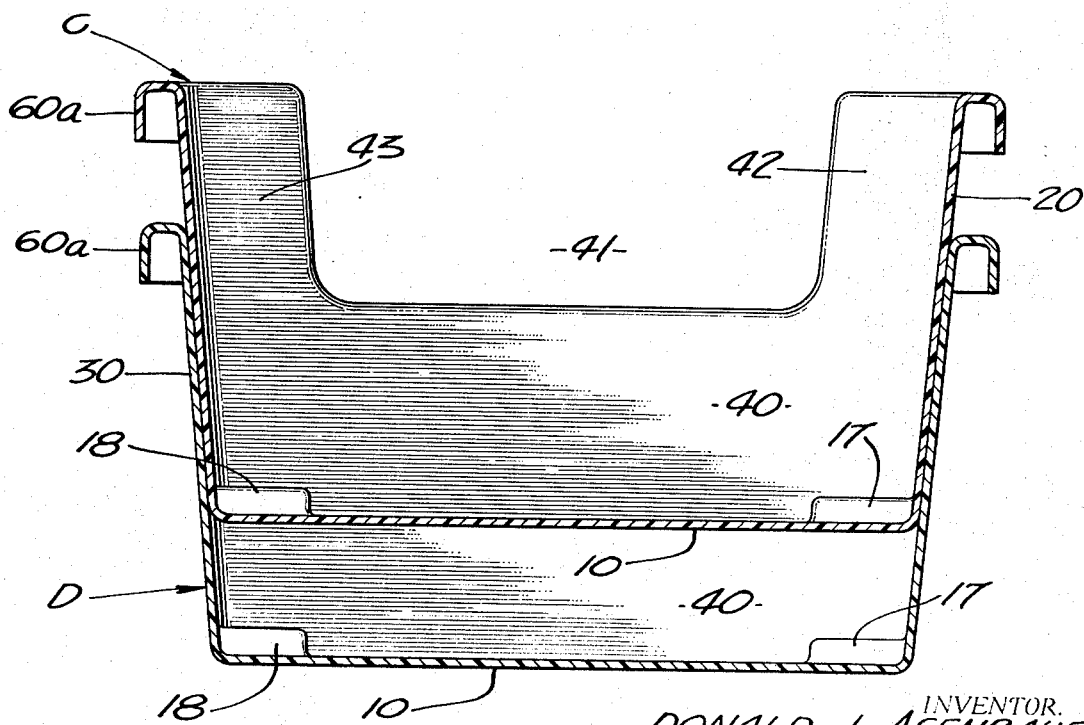

FIG. 1 is a perspective view of a container in accordance with the invention;
FIG. 2 is a side elevation view, partly in cross section, of the container of FIG. 1;
FIG. 3 is a front end elevation view of the container;
FIG. 4 is a top plan view of the container;
FIG. 5 is a fragmentary cross-sectional view showing a corner detail on the line 5—5 of FIG. 2;
FIG. 6 is a fragmentary elevation view taken on the line 6—6 of FIG. 2;
FIG. 7 is a perspective view of two of the containers of the invention, one stacked above the other;
FIG. 8 is a longitudinal vertical cross-sectional view taken on the line 8—8 of FIG. 7;
FIG. 9 is a transverse vertical cross-sectional view taken on the line 9—9 of FIG. 8;
FIG. 10 is a longitudinal vertical cross-sectional view taken on the line 10—10 of FIG. 9;
FIG. 11 is a transverse vertical cross-sectional view taken on the line 11—11 of FIG. 10;
FIG. 12 is a fragmentary transverse vertical cross-sectional view taken on the line 12—12 of FIG. 10;
FIG. 13 is a fragmentary horizontal cross-sectional view taken on the line 13—13 of FIG. 10;
FIG. 14 is a perspective view of two of the containers of the invention showing one nested inside the other;
FIG. 15 is a longitudinal vertical cross-sectional view taken on the line 15—15 of FIG. 14;
FIG. 16 is a transverse vertical cross-sectional view taken on the line 16—16 of FIG. 15; and
FIG. 17 is a transverse vertical cross-sectional view taken on the line 17—17 of FIG. 15.

PREFERRED EMBODIMENT

Drawing sheets 1 and 2 (FIGS. 1 to 6) show the container A of the present invention in its various details Drawing sheets 3 to 5 (FIGS. 7 to 13) show containers A and B in stackably superimposed relationship. Drawing sheets 6 and 7 (FIG. 14 to 17) show containers C and D in nesting relationship. It will be unterstood, however, that containers A, B, C, and D are altogether identical, and the letter designations are used simply for convenience in the drawings.

Referring now particularly to drawing FIGS. 1 to 6, inclusive, the container of the present invention will be described. The container is of a genrally rectangular configuration and has a flat horizontal bottom wall 10 from which the side walls 20, 30 and end walls 40, 50 rise upwardly. The front end wall 40 is cut away at its upper center to provide a bin opening 41. Each of the side walls is convoluted inwardly at a point near the rear end wall 50 so as to provide a pair of stacking posts 22, 32 which are adapted for supporting the bottom wall of a superimposed container.

More specifically, the container is integrally formed of thin-walled plastic material, hence the side wall 20 rises upward from one edge 11 of the bottom wall 10 while the side wall 30 rises upward from another edge 12 of the bottom wall. Side walls 20 and 30 are slightly divergent, that is, their upper edges are separated somewhat further than their lower edges. In similar fashion the front end wall 40 rises upward from the end edge 13 of the bottom wall and read end wall 50 rises upward from end edge 14 of the bottom wall. Front end wall 40 is rearwardly inclined, as best seen in FIG. 2. Rear end wall 50 is also readwardly inclined, but the two end walls diverge somewhat outwardly, hence the rearward inclination of the rear end wall 50 is greater than the rearward inclination of front end wall 40.

The convolutions in the side walls are also rearwardly inclined, so that the upper ends 24, 34, of the stacking posts 22, 32 are located somewhat rearwardly of the bottoms of the convolutions. Bottom wall 10 also has a pair of rear stacking formations 15, 16 formed therein, these stacking formations being located somewhat rearwardly of the bottom ends of the respective stacking posts 22, 32 but spaced somewhat from the bottom of rear end wall 50. The upper end 34 of stacking post 32 is recessed at 34a so as to provide a positive interlock with stacking formation 16, as is best seen in FIG. 10. The upper end 24 of stacking post 22 has a similar recess 24a which interengages with the stacking formation 15.

Side wall 20 is convoluted inwardly at 21a and 21b to form the stacking post 22, and at the bottom of stacking post 22 the corresponding part of bottom wall 10 is omitted. Thus the stacking post 22 on its exterior side 23 is hollow throughout its length, permitting nesting of the containers as best shown in FIG. 16. Side wall 30 has similar convolutions 31a, 31b and the exterior side 33 of its stacking post 32 is hollow in like manner.

The tops of 24, 34 of the stacking posts 22, 32 are aligned with the upper extremities 25, 35 of the respective side walls. A peripheral shelf 60 extends horizontally outward from the entire extent of the upper extremity of the side walls and end walls, and then depends downwardly at 60a.

The bin opening 41 is bounded by a peripheral flange 46 which projects horizontally forward from the bottom of the bin opening and also projects forward an equal extent from the vertical sides of the bin opening. Flange 46 and shelf 60 together provide a continuous peripheral flange for the entire container.

The outer ends 42, 43 of front end wall 40 are comparatively short, since the bin opening 41 extends through more than half the width of the container. Above the wall portion 42 there is a stacking formation 44 formed in the shelf 60, and a similar stacking formation 45 is formed above the wall portion 43. Front stacking formations 17, 18 are also provided in the front end corners of bottom wall 10. In the stacked position of the containers the formations 17 and 44 are interengaged, and the formations 18 and 45 are interengaged, all with a positive locking action as shown in FIGS. 7 to 10, inclusive.

An important advantage of the present invention is that the stacked containers are aligned at their front ends so that all of the bin openings 41 are in vertical alignment (FIGS. 7 to 10).

Another advantage of the invention is that when handling loaded containers on a conveyor system the rearward or inward slope of front end wall 40 prevents the contents from spilling out.

A further advantage of the invention is the solid stacking support at the front end, and the positive interengagement of elements 17 and 44, 18 and 45, 15 and 24, 16 and 34, which provides stable support despite outward bulging of the side or end walls of an underneath container in the stack.

What is claimed is:

1. A stacking and nesting bin box comprising a flat horizontal bottom wall, a pair of generally parallel side walls rising up from the sides of said bottom wall and diverging somewhat outwardly, a pair of generally parallel end walls arising up from the ends of said bottom wall and sloping rearwardly and diverging somewhat outwardly, one of said end walls representing the front end of said box and being cut away at its upper center to provide a bin opening, each of said side walls being convoluted inwardly at a point near to the other end wall but spaced therefrom to provide a corresponding stacking post, each of said stacking posts extending from the top of the associated side wall downward to said bottom wall and being hollow on its exterior side to thereby provide a nesting relationship with the stacking post of another identical container when disposed underneath said bin box, said bottom wall also having stacking formations therein immediately to the rear of said stacking posts and substantially vertically aligned with the tops of said posts, said stacking formations being adapted to retentively engage the tops of the stacking posts of the underneath container while the front end of said bottom wall concurrently rests upon the outer ends of the front end wall of the underneath container.

2. A container as claimed in claim 1 wherein the outer ends of the front end wall thereof are provided with stacking formations.

3. A container as claimed in claim 2 wherein the front end of said bottom wall is provided with stacking formations that are adapted to interengage the stacking formations of said front end wall.

4. A container as claimed in claim 1 which is integrally formed of thin-walled plastic material.

5. A container as claimed in claim 1 which additionally includes a peripheral shelf extending horizontally outwardly from the upper extremities of said side and end walls.

6. A container as claimed in claim 1 which additionally includes a flange projecting forwardly from said front end wall about the periphery of said bin opening.

7. A container as claimed in claim 5 which additionally includes a flange projecting forwardly from said front end wall about the periphery of said bin opening.

8. A container as claimed in claim 7 wherein the outer ends of the front end wall thereof are provided with stacking formations, and the front end of said bottom wall is provided with stacking formations adapted for interengagement therewith.

9. A container as claimed in claim 7 which is integrally formed of thin-walled plastic material.

10. A stacking and nesting bin box having a generally rectangular configuration, including a flat horizontal bottom wall and upstanding and outwardly divergent side and end walls, the front end wall being cut away at its upper center to provide a bin opening, each of the side walls being convoluted inwardly at a point near the rear end wall so as to provide a pair of stacking posts for supporting the bottom wall of a stackably superimposed identical container, each of said stacking posts extending from the top of the associated side wall downward to said bottom wall and being hollow on its exterior side and enlarged at its lower end to thereby provide a nesting relationship for two identical containers, the rearward sides of said stacking posts being parallel with said front end wall so that a superimposed identical container may be stacked with its bottom wall resting at two points on said front end wall and at two other points on said stacking posts.

11. A stacking and nesting bin box as claimed in claim 10 wherein stacking formations are provided on said bottom wall at its front corners and to the rear of said stacking posts so as to retain a superimposed identical container in fixed position, said front end wall sloping rearwardly so that the bin openings of vertically stacked containers are vertically aligned.

12. A container as claimed in claim 10 which additionally includes a flange projecting forwardly from said front end wall about the periphery of said bin opening, the front edge of said flange being vertical.

References Cited

UNITED STATES PATENTS

| | | | |
|---|---|---|---|
| 2,994,457 | 8/1961 | Fornas. | |
| 3,113,680 | 12/1963 | Frater et al. | 211—126 |
| 3,219,232 | 11/1965 | Wilson. | |
| 3,326,410 | 6/1967 | Asenbauer. | |
| 3,347,394 | 10/1967 | Gould | 211—126 |
| 3,398,840 | 8/1968 | Wilson | 211—126 |

RAMON S. BRITTS, Primary Examiner

U.S. Cl. X.R.

220—97